(No Model.)
R. ANDREW & J. D. VENDRICK.
CORN ROW MARKER.
No. 365,039. Patented June 21, 1887.
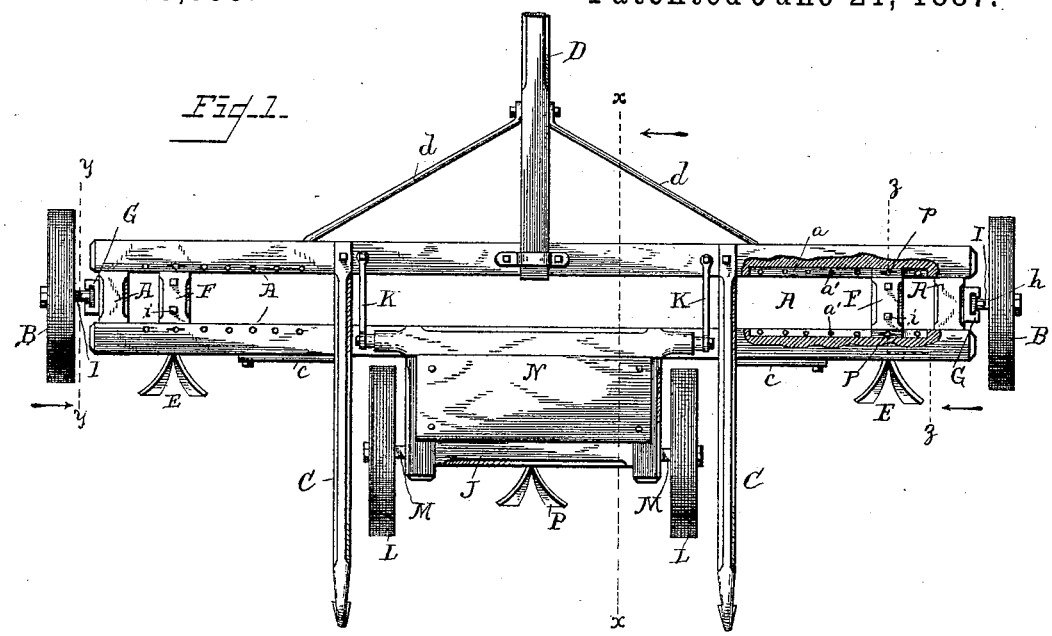
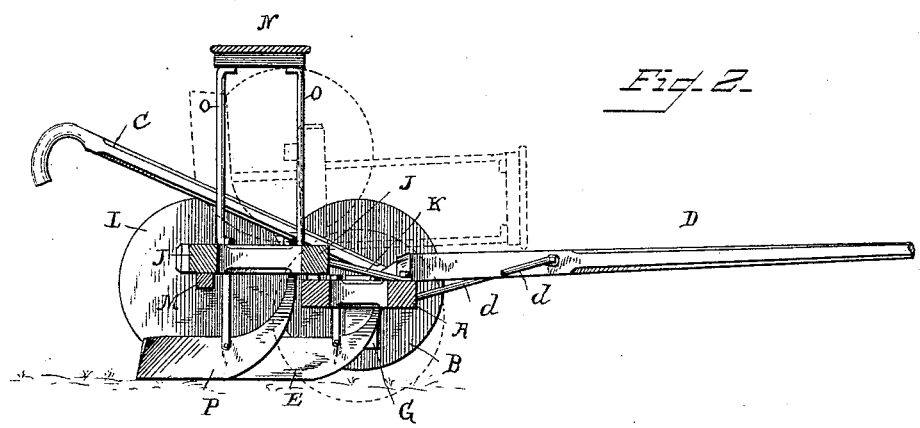
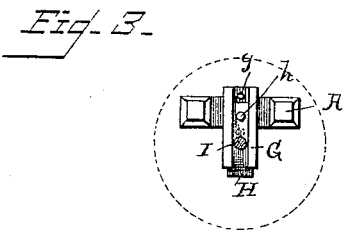
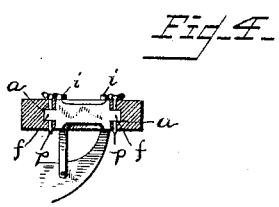
Witnesses
Albert Spuiden
G. W. Talloch
Inventor
Riley Andrew
James D. Vendrick
By their Attorney
Wm Hunter Myers

UNITED STATES PATENT OFFICE.

RILEY ANDREW AND JAMES D. VENDRICK, OF WARREN, INDIANA.

CORN-ROW MARKER.

SPECIFICATION forming part of Letters Patent No. 365,039, dated June 21, 1887.

Application filed April 19, 1887. Serial No. 235,335. (No model.)

*To all whom it may concern:*

Be it known that we, RILEY ANDREW and JAMES D. VENDRICK, citizens of the United States of America, residing at Warren, in the county of Huntington and State of Indiana, have invented certain new and useful Improvements in Corn-Row Markers, of which the following is a specification, reference being had therein to the accompanying drawings.

Our invention relates to improvements in corn-row markers for laying out ground for planting corn and other cereals in rows.

The invention consists in an auxiliary frame mounted on wheels and carrying a central marker and the driver's seat, this frame being supported on wheels and hinged to the main frame in such a manner as to relieve the latter of the weight of the driver, whereby the side markers are enabled to more effectually conform to the undulations of the ground than if the weight of the driver were added to the main frame.

The invention consists, also, in certain details of construction, which will first be described in connection with the accompanying drawings, and then clearly pointed out in the claims.

Figure 1 of the drawings is a plan view of our corn-row marker, partly broken away. Fig. 2 is a transverse section of the same, taken on the line $x$ $x$ of Fig. 1, looking in the direction of the arrow, and showing in dotted lines the position of the auxiliary frame when thrown forward out of use. Fig. 3 is a transverse section, taken on the line $y$ $y$ of Fig. 1, showing the manner of adjusting the carrying-wheels of the main frame. Fig. 4 is a transverse section, part in elevation, taken on the line $z$ $z$ of Fig. 1, illustrating the adjustability of the side marker.

Similar letters of reference indicate corresponding parts in all the figures.

Referring to the drawings, A represents the main frame; B, the carrying-wheels; C, the handles, braced by rods $c$, secured to the rear beam of the main frame; D, the tongue, braced by rods $d$, secured to the front beam of the main frame; E, the side markers, and F the adjustable blocks to which the side markers are secured.

It is desirable that the carrying-wheels B should be adjustable vertically with relation to the main frame A, in order that they may be raised from the ground while the corn-row marker is in operation in the field and lowered to the ground, thereby elevating the side markers when the machine is to be moved to and from the field. For this purpose we secure a T-slotted standard, G, to each end beam of frame A, and in the slot in each standard we place a slide, H, in which the axle I of each carrying-wheel is journaled, which slide is adjustably secured in the standard by means of a pin, $h$, passed through the slide and one of a series of holes, $g$, in the standard, as seen in Fig. 3.

The markers, which are made preferably of iron or steel, are cutter-shaped in front, and of a flaring V shape at the heel, as shown, and they are secured to blocks F by means of bolts $i$. These blocks are formed with tongues $f$ on each side, which engage with corresponding grooves, $a$, in the longitudinal beams of the main frame, and are held in place by means of pins $p$, passing through perforations $a'$ in the beams, and also through like perforations in the tongues of the blocks, as clearly illustrated in Figs. 1 and 4. By this construction the side markers can be readily adjusted closer together or farther apart, as desired.

J represents a small auxiliary frame, designed to occupy a position between the handles attached to the main frame. The front beam of this auxiliary frame is journaled at each end in an iron bracket, K, secured to and extending rearwardly from the front beam of the main frame, the auxiliary frame being supported at the rear by wheels L, mounted upon an axle, M, secured to the under side of the frame. The driver's seat N is mounted upon standards O, rising from this frame J, and the central marker, P, is rigidly secured to the under side of said frame in the same manner as the side markers are secured to the blocks F.

The operation of the machine is so apparent that description is unnecessary; but it will be observed, however, that by means of the auxiliary frame mounted on wheels and carrying the driver's seat and central marker, the weight of the driver is removed from the main frame, whereby the side markers are enabled more readily to follow the undulations of the ground than if the weight of the driver were added to that of the main frame. It will also be observed that the central marker will follow the surface of the ground by reason of the support it derives from the wheels L.

In moving the machine to and from the field the carrying-wheels B may be lowered to the ground, thus elevating the side markers, and the auxiliary frame thrown forward, so that the driver's seat rests on the tongue, as seen in dotted lines in Fig. 2.

Having thus described our invention, what we claim as new, and desire to secure by Letters Patent, is—

1. In a corn-row marker, the combination, with a main frame provided with side markers, of an auxiliary frame carrying a central marker, said auxiliary frame being hinged to the main frame and supported on wheels, for the purpose set forth.

2. The combination, with a main frame provided with side markers, of an auxiliary frame carrying a central marker and a driver's seat, said auxiliary frame being hinged to the main frame and supported on wheels, for the purpose set forth.

3. The combination, with a main frame provided with vertically-adjustable carrying-wheels and longitudinally-adjustable side markers, of an auxiliary frame carrying a central marker and a driver's seat, said auxiliary frame being hinged to the main frame and supported on wheels, substantially as described, and for the purpose set forth.

In testimony whereof we affix our signatures in presence of two witnesses.

RILEY ANDREW.
    JAMES D. VENDRICK.

Witnesses:
 JOSEPH ELDER,
 ELIJAH HENDERSON.